(12) United States Patent
Dees et al.

(10) Patent No.: US 10,591,067 B2
(45) Date of Patent: Mar. 17, 2020

(54) CERAMIC VALVE UNIT FOR A BEVERAGE MACHINE

(71) Applicant: Koninklijke Douwe Egberts B.V., Utrecht (NL)

(72) Inventors: Hendrik Johan Dees, Utrecht (NL); Koen Standaar, Utrecht (NL); Antonius Johannes Spijker, Utrecht (NL); Leonardus Cornelis van der Velden, Utrecht (NL); Mathias Antonius Fransiscus Rutten, Utrecht (NL); Bram Klabbers, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 312 days.

(21) Appl. No.: 15/621,744

(22) Filed: Jun. 13, 2017

(65) Prior Publication Data

US 2017/0350515 A1    Dec. 7, 2017

Related U.S. Application Data

(63) Continuation of application No. PCT/NL2015/050863, filed on Dec. 14, 2015.

(30) Foreign Application Priority Data

Dec. 15, 2014  (NL) ..................................... 2013985

(51) Int. Cl.
  *A47J 31/00*    (2006.01)
  *F16K 3/08*     (2006.01)
  (Continued)

(52) U.S. Cl.
  CPC ................. *F16K 3/18* (2013.01); *A47J 31/41* (2013.01); *A47J 31/46* (2013.01); *B67D 1/0008* (2013.01);
  (Continued)

(58) Field of Classification Search
  CPC .......... A47J 31/46; A47J 31/402; A47J 31/41; F16K 11/074; F16K 3/08; F16K 3/085
  (Continued)

(56) References Cited

U.S. PATENT DOCUMENTS

| 361,183 A | 4/1887 | Reisner |
| 3,682,090 A | 8/1972 | Meriggi |

(Continued)

FOREIGN PATENT DOCUMENTS

| CH | 675312 A5 | 9/1990 |
| CN | 101835414 A | 9/2010 |

(Continued)

OTHER PUBLICATIONS

Translation of Chinese Office Action and Search Report, App. No. 2015800753051 (dated Feb. 25, 2019).

(Continued)

*Primary Examiner* — Reginald Alexander
(74) *Attorney, Agent, or Firm* — Foley & Lardner LLP

(57) ABSTRACT

A ceramic valve unit for a beverage machine including a housing, a water inlet pipe for receiving hot water, an outflow opening, and first and second ceramic elements within the housing. The first and second ceramic elements each have mutually abutting surfaces and are relatively movable in a plane common to the abutting surfaces. The plane common to the abutting surfaces is downstream of the water inlet pipe and the first ceramic element, but upstream of the second ceramic element and the outflow opening. The first ceramic element has at least differently sized first and second openings for allowing a liquid flow there through. The second ceramic element has only a single liquid flow opening permanently aligned with the outflow opening. The first ceramic element is selectively slidable between at least first and second different positions preferably in a path of (Continued)

movement about a centre of rotation beyond the boundaries of the first ceramic element.

28 Claims, 13 Drawing Sheets

(51) Int. Cl.
    *F16K 3/18* (2006.01)
    *A47J 31/46* (2006.01)
    *A47J 31/41* (2006.01)
    *F16K 11/074* (2006.01)
    *B67D 1/00* (2006.01)
    *A47J 31/40* (2006.01)

(52) U.S. Cl.
    CPC ............ *F16K 3/085* (2013.01); *F16K 11/074* (2013.01); *A47J 31/402* (2013.01)

(58) Field of Classification Search
    USPC ............ 99/300, 293, 302 R, 307, 280; 137/625.46, 636.1, 595, 605, 863, 625.3, 137/625.31; 251/315.04, 206, 208, 292, 251/304
    See application file for complete search history.

(56) References Cited

U.S. PATENT DOCUMENTS

| | | | |
|---|---|---|---|
| 3,884,391 A | | 5/1975 | Pauliukonis |
| 4,015,749 A | | 4/1977 | Arzberger et al. |
| 4,947,738 A | | 8/1990 | Eugster |
| 6,682,047 B1 | | 1/2004 | Piscaer et al. |
| 7,178,452 B2 * | | 2/2007 | Fischer .................. A47J 31/40 |
| | | | 137/625.46 |
| 8,444,016 B2 * | | 5/2013 | Lussi ...................... A47J 31/40 |
| | | | 222/129.4 |
| 8,646,380 B2 * | | 2/2014 | Mueller ............. A47J 31/4485 |
| | | | 99/293 |
| 9,095,154 B2 | | 8/2015 | Anliker et al. |
| 2004/0227123 A1 * | | 11/2004 | Rodgers ................ F16K 25/005 |
| | | | 251/315.04 |
| 2009/0108224 A1 * | | 4/2009 | Clasen .................... F16K 3/085 |
| | | | 251/315.04 |
| 2009/0214742 A1 | | 8/2009 | Peden et al. |
| 2010/0126354 A1 * | | 5/2010 | Mahlich ............... A47J 31/3671 |
| | | | 99/293 |
| 2010/0162901 A1 | | 7/2010 | Mahlich |
| 2010/0193544 A1 | | 8/2010 | Rusch et al. |
| 2012/0161046 A1 | | 6/2012 | Tsai |
| 2015/0157166 A1 | | 6/2015 | Van Os et al. |

FOREIGN PATENT DOCUMENTS

| | | |
|---|---|---|
| DE | 21 60 501 A1 | 6/1973 |
| DE | 42 35 262 A1 | 4/1994 |
| DE | 44 27 745 A1 | 2/1996 |
| DE | 19503618 C1 | 8/1996 |
| DE | 20 2008 007 131 U1 | 10/2009 |
| EP | 0 307 497 A1 | 3/1989 |
| EP | 0 409 305 A2 | 1/1991 |
| EP | 2 011 421 A1 | 1/2009 |
| EP | 2 030 538 A2 | 3/2009 |
| EP | 2 924 326 A1 | 9/2015 |
| JP | 2004-528143 | 9/2004 |
| JP | 5615993 B1 | 10/2014 |
| WO | WO-85/05167 A1 | 11/1985 |
| WO | WO-00/45073 A1 | 8/2000 |
| WO | WO-02/100224 A1 | 12/2002 |
| WO | WO-2007/120045 A2 | 10/2007 |
| WO | WO-2008/143505 A1 | 11/2008 |
| WO | WO-2008/147195 A1 | 12/2008 |
| WO | WO-2009/018672 A1 | 2/2009 |
| WO | WO-2011/037464 A1 | 3/2011 |
| WO | WO-2014/003570 A2 | 1/2014 |
| WO | WO-2014081037 A1 * | 5/2014 ........... F16K 31/535 |
| WO | WO-2014/191217 | 12/2014 |

OTHER PUBLICATIONS

International Search Report and Written Opinion, PCT/NL2015/050863, 10 pages (dated May 9, 2016).

English-language translation of Japanese Office Action, App. No. 2017-531889, 11 pages (dated Dec. 3, 2019).

\* cited by examiner

Section P-P

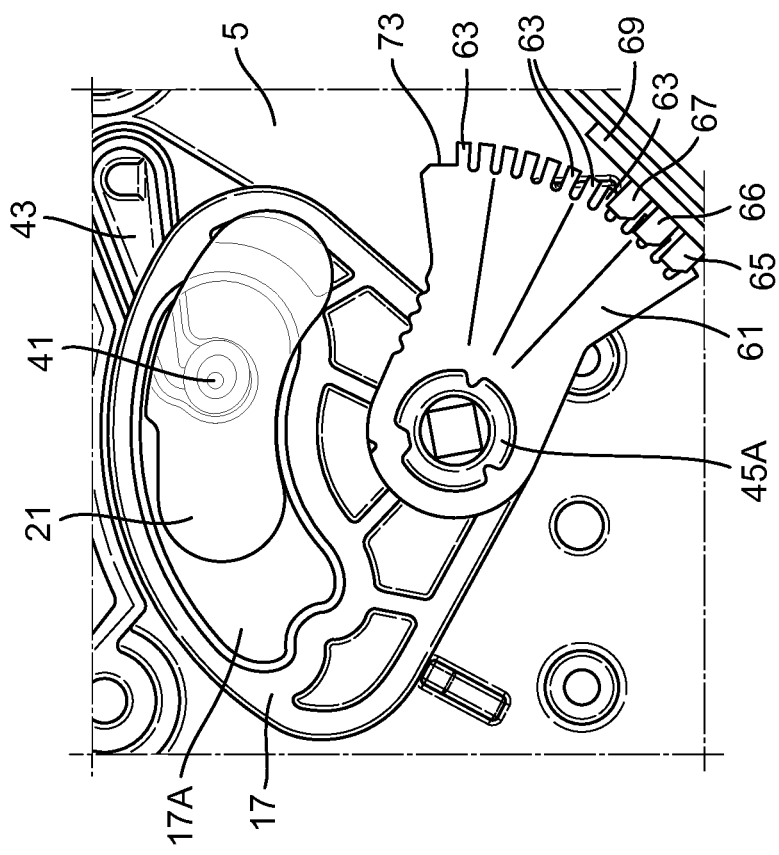
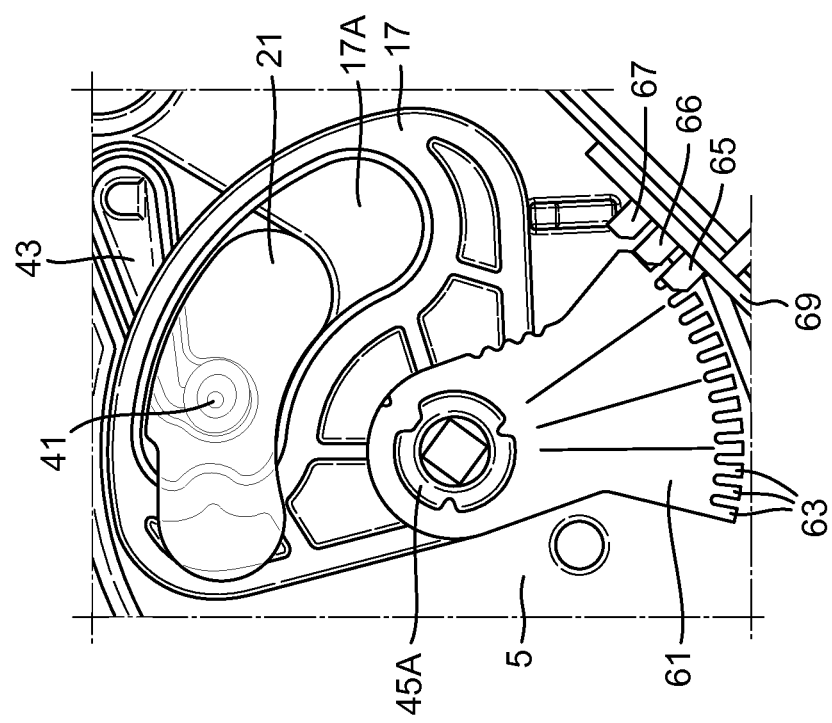

CERAMIC VALVE UNIT FOR A BEVERAGE MACHINE

CROSS-REFERENCE TO RELATED APPLICATIONS

This application is a continuation of PCT/NL2015/050863, filed Dec. 14, 2015, which claims the benefit of and priority to Netherlands Application No. NL 2013985, filed Dec. 15, 2014; the entire contents of all of which are incorporated herein by reference.

BACKGROUND

The invention relates to a ceramic valve unit for a beverage machine.

Such ceramic valve units are generally known and one example is described in U.S. Pat. No. 6,682,047. Because such valve units are used to distribute hot water or steam between different flow paths in a beverage preparing machine, a suitable material for the valve elements that come into contact with the hot water or steam has been found in ceramic materials. While such materials give excellent service and allow fluid tightness under demanding circumstances, their manufacture and cost have remained critical factors.

SUMMARY

Accordingly it is an object of the present invention to propose an improved ceramic valve unit. In a more general sense it is thus an object of the invention to overcome or reduce at least one of the disadvantages of the prior art. It is also an object of the present invention to provide alternative solutions which are less cumbersome in assembly and operation and which moreover can be made relatively inexpensively. Alternatively it is an object of the invention to at least provide a useful alternative.

To this end the invention provides a ceramic valve unit as defined in one or more of the appended claims. Such a valve unit is efficient and economical to manufacture, in that the size of the necessary ceramic elements can be kept as small as possible. Thereby the materials that do not come in direct contact with hot water or steam can be made from less expensive materials, while using less critical manufacturing processes. It thereby also becomes economically feasible to offer a greater selection of valve positions, without significantly increasing the size of the ceramic elements.

In particular the invention relates to a ceramic valve unit for a beverage preparation machine, which ceramic valve unit includes a housing, a water inlet pipe for receiving hot water, an outflow opening, and first and second ceramic elements within the housing, the first and second ceramic elements each having mutually abutting surfaces and being relatively movable in a plane common to the abutting surfaces, wherein the plane common to the abutting surfaces is downstream of the water inlet pipe and the first ceramic element, but upstream of the second ceramic element and the outflow opening, wherein the first ceramic element has at least differently sized first and second openings for allowing a liquid flow there through, wherein the second ceramic element has only a single liquid flow opening permanently aligned with the outflow opening, and wherein the first ceramic element is engaged for sliding movement by an operating arm sector of a material different from ceramic. Optionally the first ceramic element can be selectively slidable between at least first and second different positions in a path of movement about a centre of rotation positioned beyond the boundaries of the first ceramic element. Further optionally the first opening can be a nozzle for generating a jet. Alternatively in this regard the second opening of the first ceramic element and the single liquid flow opening of the second ceramic element can be of the same size.

In one example the first and second ceramic elements can be biased in mutual abutting relationship by a compression spring. Optionally the first and second ceramic valve elements are biased against a resilient elastomeric pad resting against an inside of the housing that is coincident with the outflow opening and has a through flow opening corresponding therewith. Then optionally, when having an air inlet passage outside of the path of movement of the first ceramic element, it can be arranged to cooperate with a movable valve element that is integrally formed with the resilient sealing pad. Furthermore the air inlet passage can then join the outflow downstream of the second ceramic element. The air inlet passage can then also join the outflow in a T-junction.

In yet another example the first ceramic element can be movable between at least three different positions, and an additional third position can be a closed position. Also in this particular example the first ceramic element can be arranged to be movable between at least four different positions, and an additional fourth position can then have a plurality of nozzles aligned with the single liquid flow opening of the second ceramic element.

As a further option movement of the first ceramic element between at least its first and second different positions can be effected by an electric motor. Rotation of the electric motor can then be governed by an encoder that is arranged to detect the at least first and second positions. When a path of movement of the first ceramic element is about a centre of rotation, the encoder can include an encoder wheel, and at least one encoder sensor. Then as a further option the encoder wheel can have a plurality of equally spaced dents about its outer periphery, and the at least one encoder sensor can be a middle one of first, second, and third sensors positioned in a sensing path coincident with the plurality of spaced dents. The first, second, and third sensors can then be spaced from one another at an interval that is less than two-times a spacing distance between adjacent dents on the encoder wheel, to more accurately detect the position of the encoder wheel then would be possible with only a single encoder sensor.

In one option the ceramic valve unit can be arranged in combination with a mixing chamber, which mixing chamber is integrally formed with the housing of the ceramic valve unit. In that particular option the mixing chamber can have an inlet that is adapted to connect to an outlet of a dosing device for a liquid beverage related product. The dosing device can then be part of an exchangeable product supply pack.

The ceramic valve unit in another option can be part of a beverage preparation machine. The beverage preparation machine comprising a mixing chamber having an inlet for receiving a doser outlet of an exchangeable supply pack, a beverage outlet, liquid supply means including a liquid flow path for supplying a liquid [water under pressure] to the mixing chamber; air supply means for supplying air to the liquid flow path, a drive shaft, and the valve unit according to one of the above examples.

A system for preparing beverage consumptions can optionally comprise: a beverage preparation machine, and at least one exchangeable supply pack arranged for holding a beverage related ingredient; while the beverage preparation machine comprises a mixing chamber having a beverage outlet, liquid supply means including a liquid flow path for supplying a liquid [water under pressure] to the mixing chamber; air supply means for supplying air to the liquid flow path, and a drive shaft; while the at least one exchangeable supply pack includes a container for holding a beverage related ingredient, and a doser having an outlet, wherein the doser is arranged for supplying the beverage related ingredient from the container to the outlet of the doser in a dosed manner; while the at least one exchangeable supply pack and the beverage preparation machine are mechanically connectable, and when connected the outlet of the doser is brought in fluid communication with the mixing chamber and the beverage preparation machine is arranged for activating the doser for supplying the ingredient from the outlet of the doser into the mixing chamber, while the liquid flow path is arranged to include a second nozzle for generating a jet of liquid which, in use, spouts into the mixing chamber, characterized in that the system further comprises a ceramic valve unit integrated into the beverage device, the ceramic valve unit including a first, second and third ceramic element wherein the third ceramic element including an outflow opening and the second element includes an inflow opening which is at least substantially aligned with the outflow opening, and while the first element is sandwiched between the third and second element, the first, second and third ceramic elements each having mutually abutting surfaces and while the first element is movable relative to the third and second element in a plane common to the abutting surfaces, wherein the first ceramic element comprises the second nozzle for allowing a liquid flow there through if the nozzle is substantially aligned with the inflow and outflow opening, and wherein the first ceramic element is selectively slidable between at least first and second different positions in a path of movement about a centre of rotation beyond the boundaries of the first ceramic element wherein in the first position the second nozzle is substantially aligned with the inflow and outflow opening so that a jet of the fluid is generated by the second nozzle and spouts via the outlet opening into the mixing chamber and wherein in the second position the second nozzle is not aligned with the inflow and outflow opening so that fluid can not flow from the inlet opening to the nozzle for generating the jet. As a further option of such a system the liquid flow path can include a first nozzle arranged for generating a hollow jet of liquid having an outer liquid portion and an inner air portion. Also optionally the first nozzle can be arranged to terminate at a side wall of the mixing chamber, and the outer liquid portion of the hollow jet can then contact a substantial portion of an inner surface of the first nozzle in an area adjacent to the mixing chamber. In association therewith the first nozzle can also taper towards the mixing chamber, and the liquid flow path can then comprise the second nozzle located upstream from the first nozzle and be arranged for generating a substantially solid jet of liquid. Then also in the first position the first and second nozzle can be positioned relative to each other such that the substantially solid jet of liquid generated by the second nozzle impacts an inner surface of the first nozzle in an impact zone causing the jet to swirl around the inner surface of the first nozzle and form a hollow jet of liquid which spouts into the mixing chamber. Additionally or alternatively in a third position of the first element relative the third and second element the first and second nozzle can be positioned relative to each other such that the substantially solid jet of liquid impact generated by the second nozzle is at least substantially aligned with the first nozzle so that the solid jet from the second nozzle flows along an inner surface of the first nozzle and the jet remains solid so that the jet which spouts into the mixing chamber is a solid jet.

BRIEF DESCRIPTION OF THE DRAWINGS

Further advantageous aspects of the invention will become clear from the appended description and in reference to the accompanying drawings, in which:

FIG. 7A shows an operating arm sector and an associated encoder in a first end position;

FIG. 7B shows the operating arm and encoder of FIG. 7A in a second end position;

DETAILED DESCRIPTION

Figure 1:
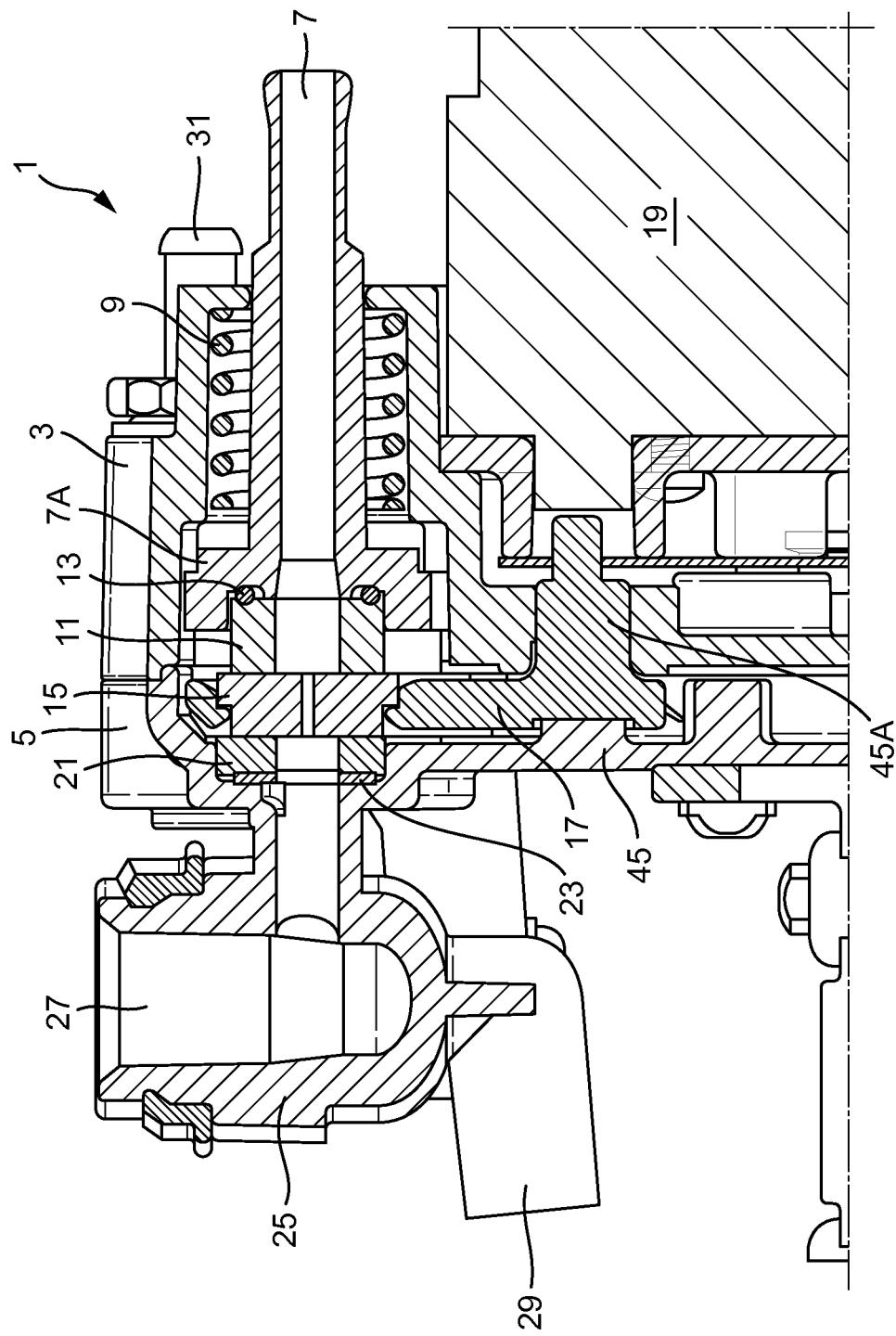
FIG. 1 is a partial elevation in cross section of a ceramic valve unit in accordance with the invention.

In the partial cross section of FIG. 1 is shown a ceramic valve unit 1, which includes a first housing part 3 and a second housing part 5. The first housing part 3 accommodates a water inlet pipe 7. The water inlet pipe 7 has a flanged end 7A, against which an expansion spring 9 bears to bring the water inlet pipe 7 in abutment with a ceramic inlet element 11. A sealing ring, such as an O-ring 13 is interposed between the flanged end 7A and the inlet disk 11 to ensure fluid tightness. The ceramic inlet element 11 bears against a ceramic slide element 15. The ceramic slide element 15 is accommodated within an aperture of an operating arm sector 17 to be engaged thereby for sliding movement. The operating arm sector 17 is driven by an electric motor 19. The ceramic slide element 15 is also biased by the spring loaded ceramic inlet element 11 into a fluid tight contact with a further ceramic element in the form of outflow element 21. The outflow element 21 bears against a resilient elastomeric sealing pad 23. Resilient sealing pad 23 may conveniently, but not necessarily, be made from silicone. The outflow element 21 and the sealing pad 23 are accommodated within a cavity (39 in FIG. 4) of the second housing part 5. The second housing part 5 can further be associated with a mixing chamber 25, which receives a liquid beverage concentrate through an inlet 27 and dispenses a beverage from an outflow 29. The first housing part 3 also includes an air inlet pipe 31.

Figure 2:
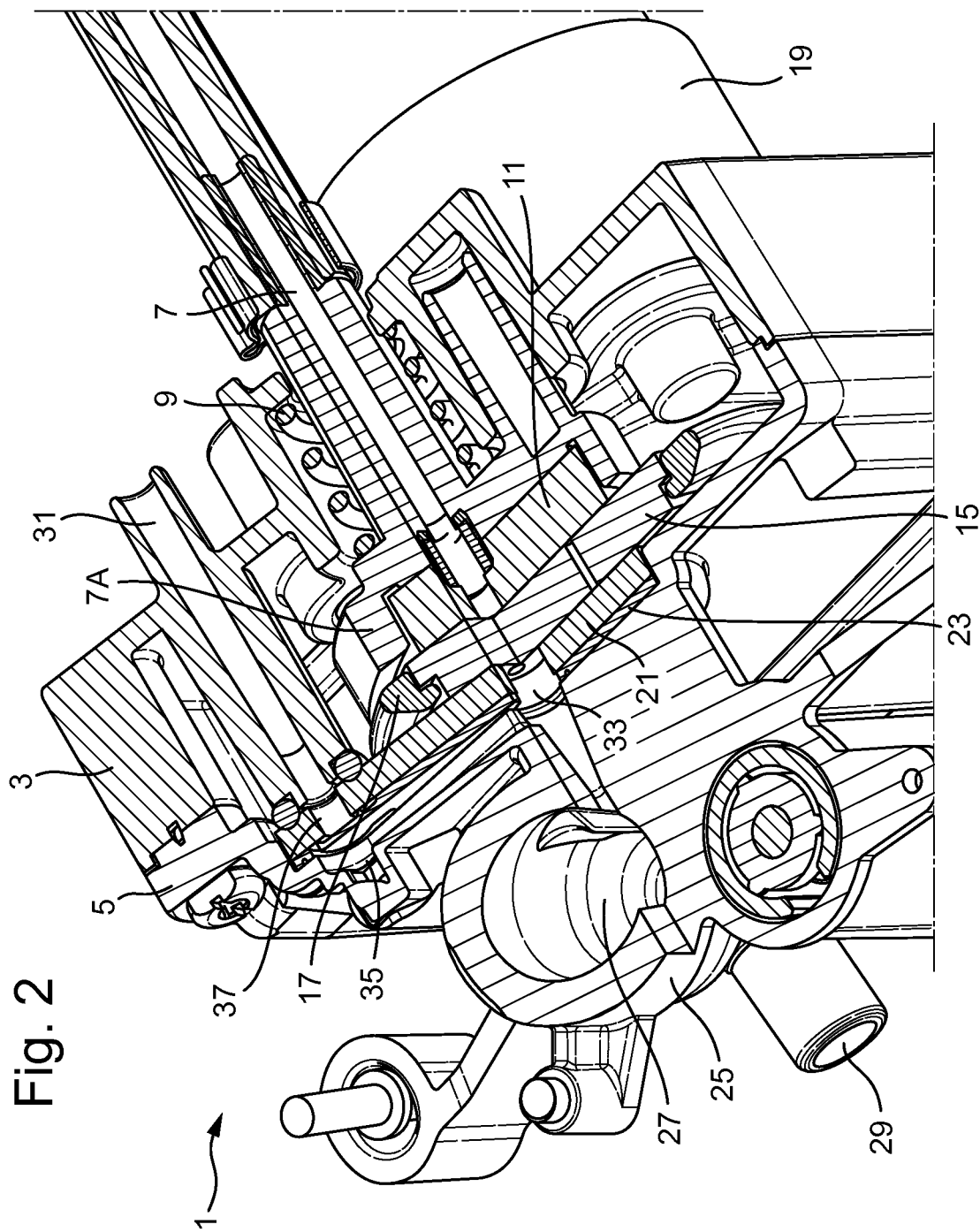
FIG. 2 is a partial isometric view, partially in cross section, of the ceramic valve unit of FIG. 1.

As further shown in the isometric partial cross section of FIG. 2 the air inlet pipe 31 via a channel (43 in FIG. 4) in the second housing part 5 can join a water flow through the water inlet pipe 7, the inlet element 11, the slide element 15, the outflow element 21, and the resilient sealing pad 23 via a T-junction 33. The T-junction 33 is integrally formed in the second housing pad 5 and includes a channel (43 in FIG. 4) that is shared by both the air inlet pipe 31 and a flush water input 35. Flush water from the flush water input 35 and air from the air inlet pipe 31 are separated by a valve element 37 that is integrally formed in the resilient pad 23, as will be explained herein below.

Figure 3:
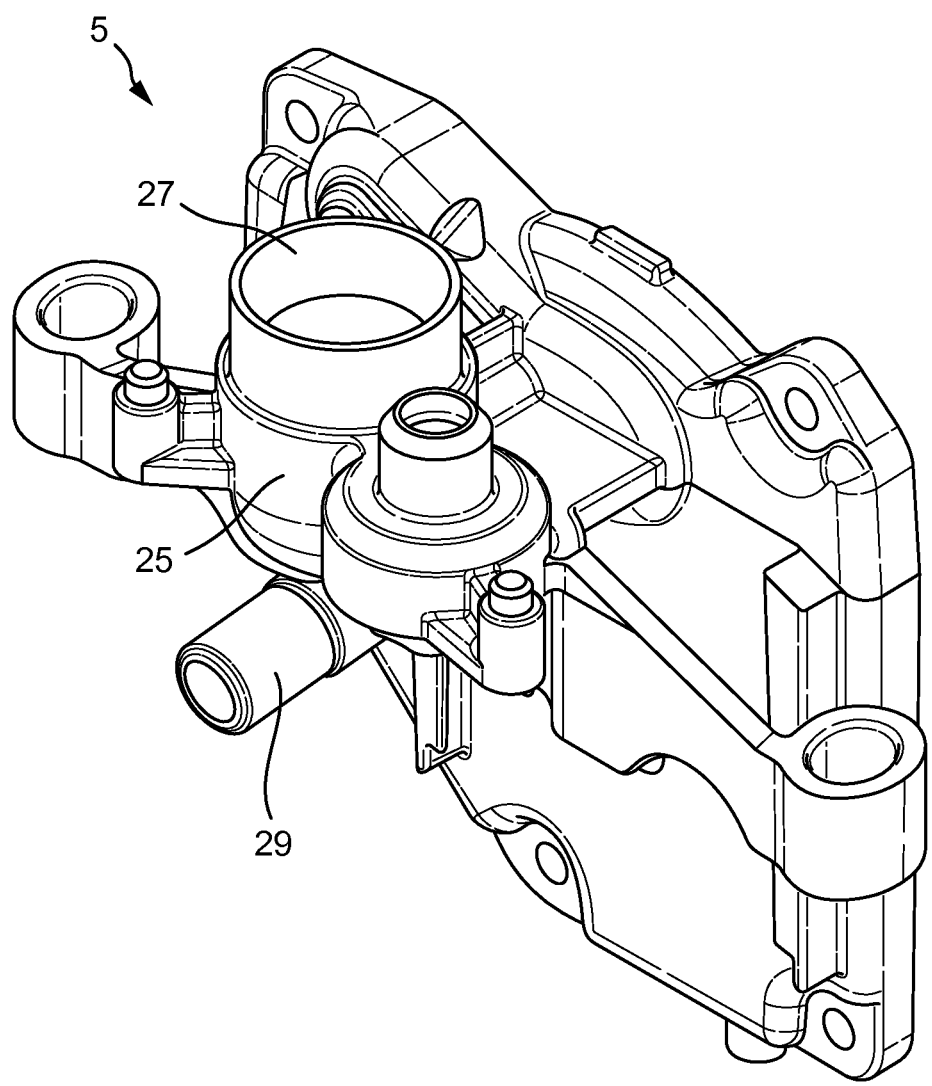
FIG. 3 is an isometric view of a housing part of the ceramic valve unit of FIGS. 1 and 2.
Figure 4:
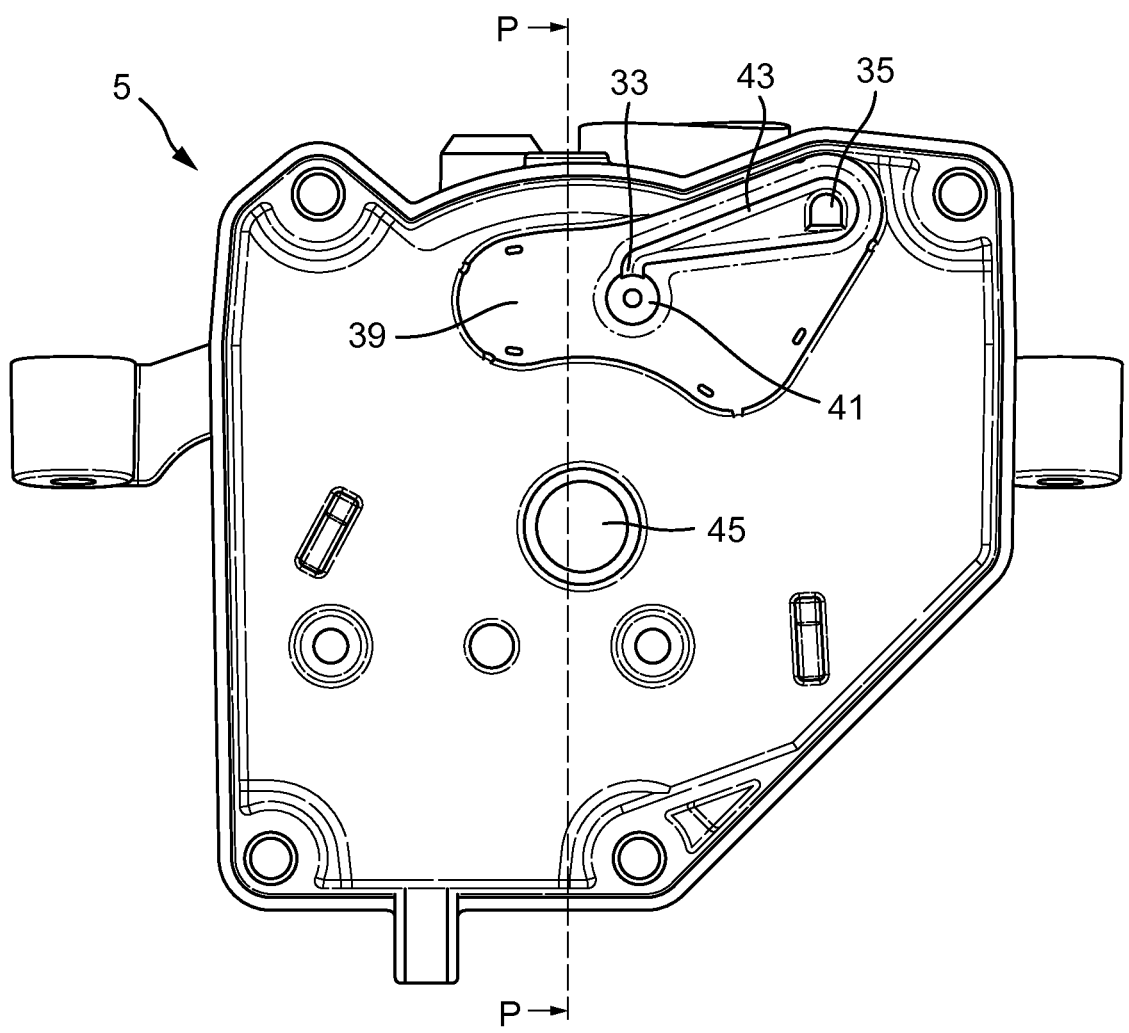
FIG. 4 is a rear elevation of the housing part of FIG. 3, showing a downstream inside thereof.

FIG. 3 is an isometric view of the second housing part 5, and FIG. 4 is a rear elevation of the second housing part of FIG. 3. As further shown in FIG. 4, the second housing part 5 has a cavity or recess 39 for receiving the sealing pad 23 and the outflow element 21. Within the cavity 39 is an outflow opening 41, which is aligned with the water inlet pipe 7, when the ceramic valve unit 1 is assembled. The flush water input 35 is in fluid communication with outflow opening 41 via a connecting channel 43 extending from the flush water input 35 to the T-junction 33. A central journal 45 is provided for pivotally receiving the operating arm sector 17.

Figure 5:
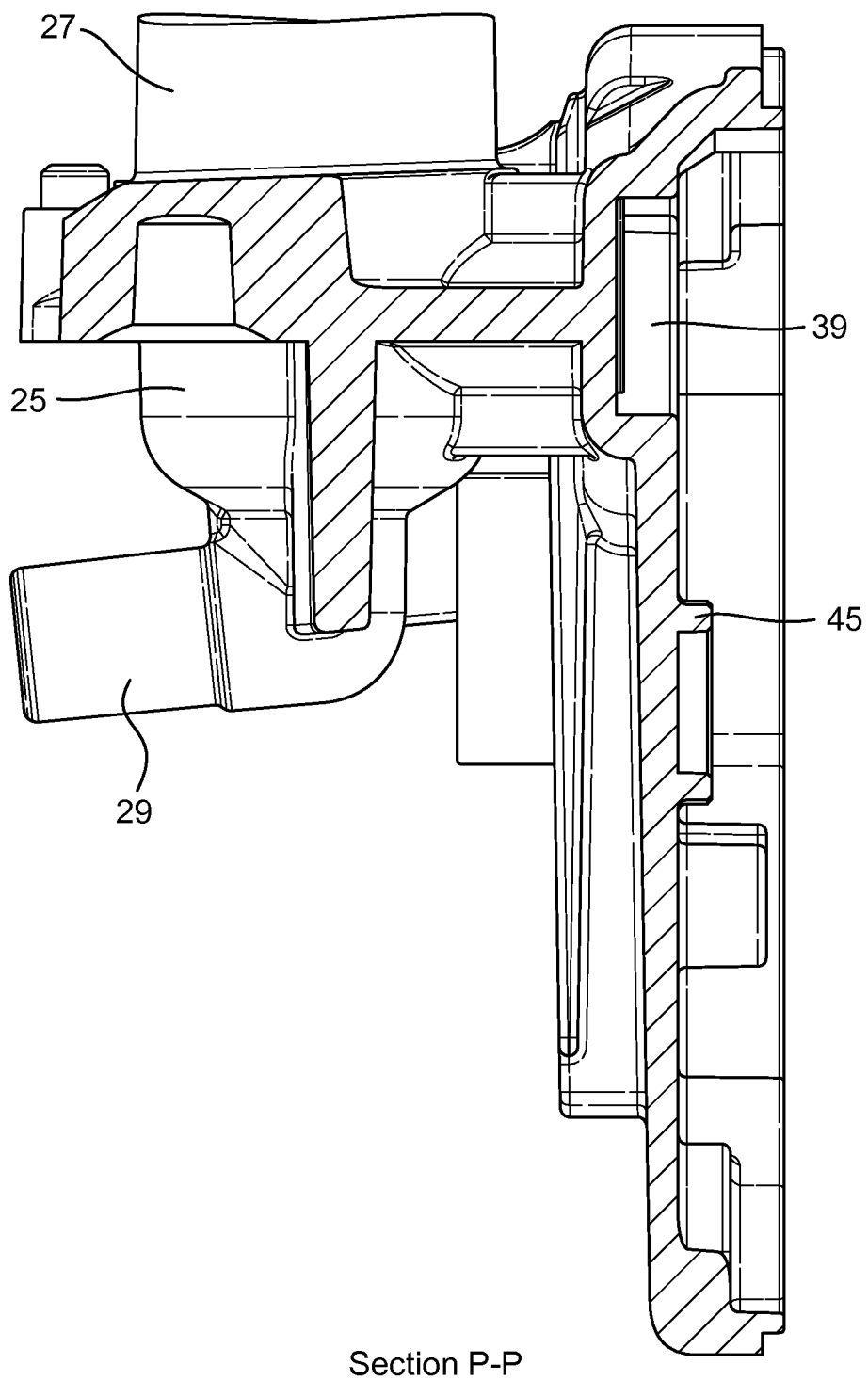
FIG. 5 is a cross section according to the arrows P-P indicated in FIG. 4.

FIG. 5 is an elevation in cross section according to the line P-P in FIG. 4, and shows the relative positions of the cavity 39 and the central journal 45.

Figure 6:
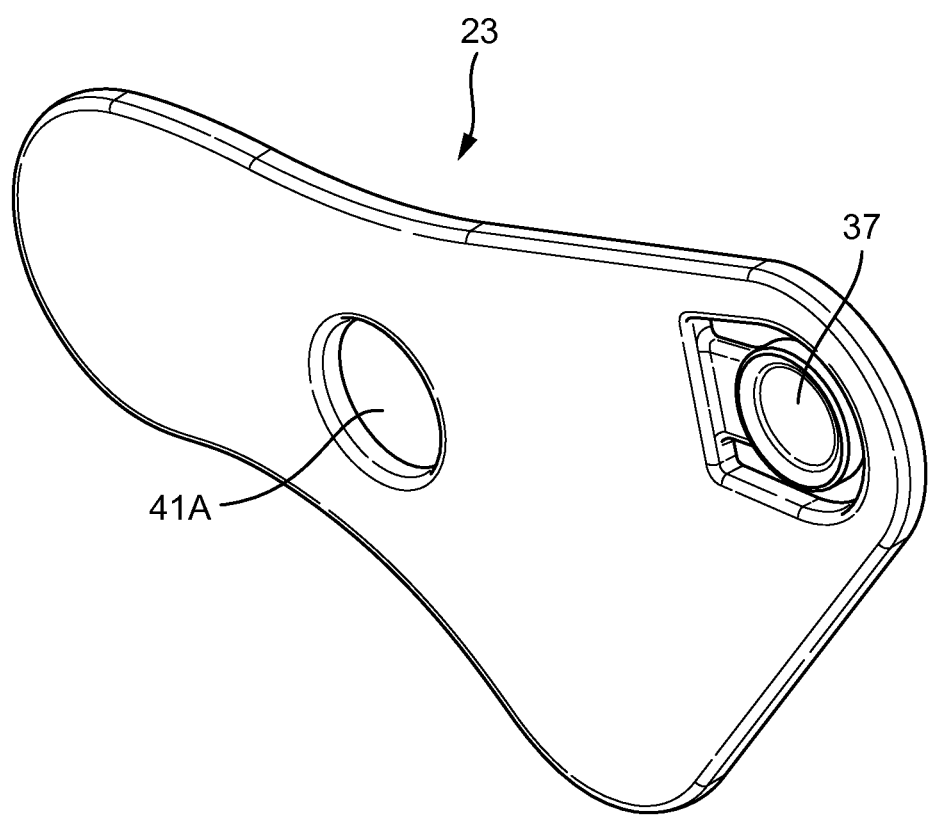
FIG. 6 is a resilient sealing pad associated with the housing part of FIGS. 3-5.

In FIG. 6 is shown the sealing pad 23, which is formed in a resilient elastomer, which can be silicone or other suitable material. In particular FIG. 6 illustrates the integrally formed valve element 37 which is movable to allow air from the air inlet pipe 31 to enter the connecting channel 43, but which also will automatically close the air inlet by the pressure of flush water when this is admitted in flush water input 35 and the connecting channel 43. The resilient sealing pad 23 is also equipped with a central opening 41A, which will align with the outflow opening 41 of the second housing part 5. The perimeter contour of the sealing pad 23 corresponds to the cavity 39 as shown in FIG. 4. On top of the sealing pad 23 will be placed the outflow element 21 which has a generally similar perimeter contour to the slide element 15, and occupies only a lower portion of the cavity 39. The outflow element 21 has a central opening in correspondence with the central opening 41A and outflow opening 41, but leaves free an area of the cavity 39 corresponding to the valve element 37 of the sealing pad 23. The ceramic outflow element 21 shown in FIGS. 1 and 2 has a configuration as described above and is further in FIGS. 7A and 7B.

Figure 8:
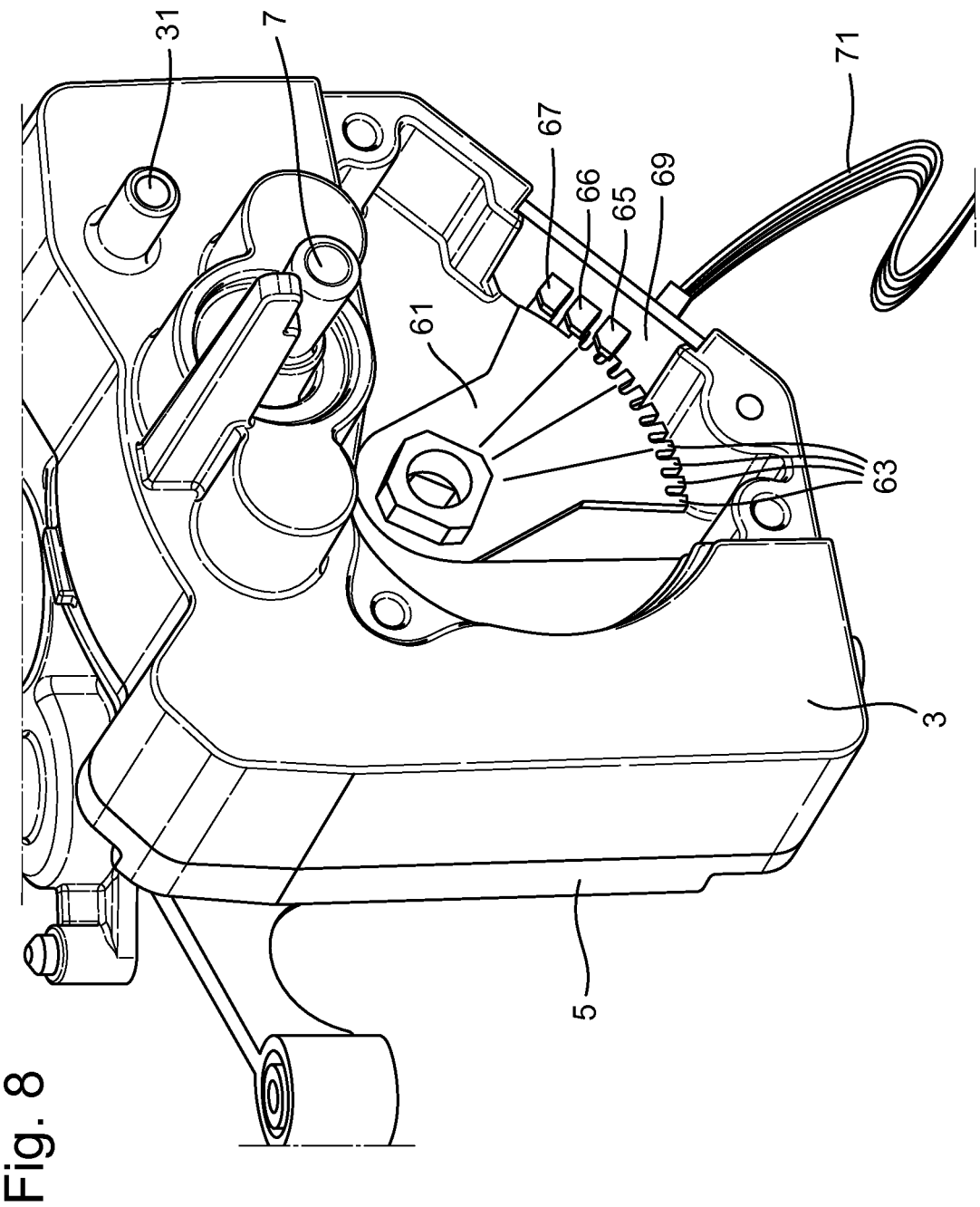
FIG. 8 shows the encoder of FIGS. 7A and 7B on another housing part.
Figure 9:
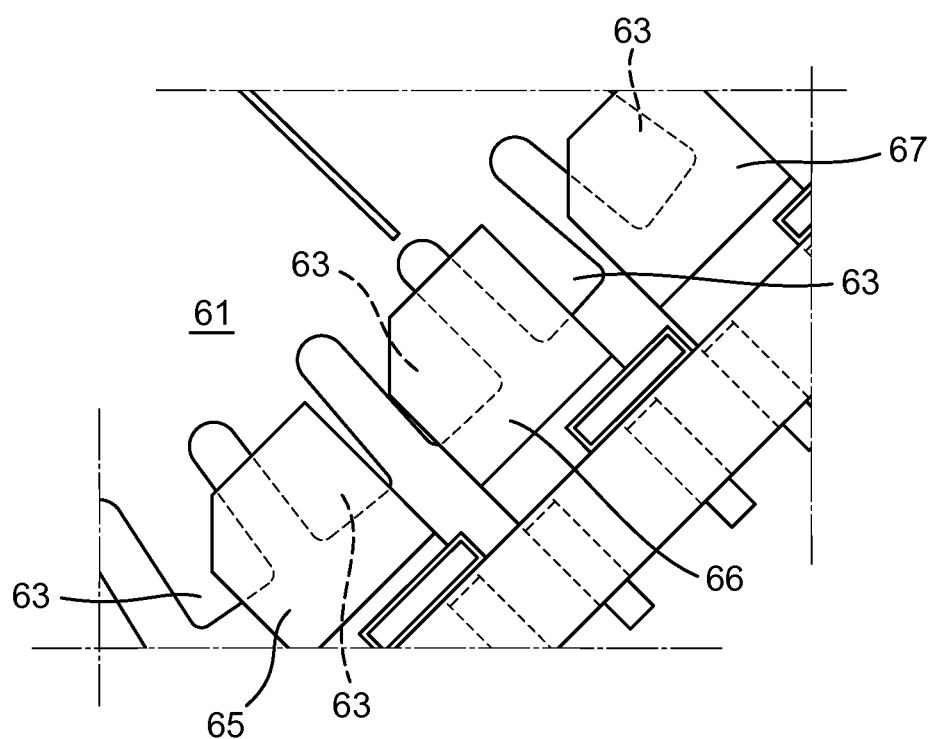
FIG. 9 is an enlarged elevation of a detail of the encoder of FIGS. 7A, 7B, and 8.

FIGS. 7A and 7B respectively show a first and a second end positions of the operating arm sector 17. It is further seen in both of FIGS. 7A and 7B, that the operating arm has an aperture 17A for holding the slide element 15, which is deleted in these Figures to reveal the outflow element 21 behind. The operating arm sector 17 is arranged to pivot about a pivot shaft 45A, which is concentric to the central journal 45. The pivot shaft 45A is driven in a known manner by geared DC motor 19. To provide proper control for the positioning of the operating arm sector 17 in predefined positions in-between the end positions of FIGS. 7A and 7B, an encoder wheel 61 is connected to the pivot shaft 45A for simultaneous rotation with the operating arm sector 17. The encoder wheel 61 has a plurality of equally spaced dents 63 about its outer periphery. The equally spaced dents 63, upon rotation of the operating arm sector 17 and the encoder wheel 61, pass between an array of three successive sensors 65, 66, 67. These successive first, second, and third sensors 65, 66, 67, as best seen in FIG. 8, are positioned on a common circuit board 69, and may conveniently be formed by light sensors. The common circuit board 69 further has a electric cable 71 for connection to a control unit of the beverage machine. The encoder wheel 61 on its leading end, as seen in FIG. 7B, has a relatively large interval 73 in advance of a first one of its dents 63. This relatively large interval 73 in combination with the successive sensors 65, 66, 67 triggers and resets the encoder operation. As further shown in FIG. 9 the encoder sensors 65, 66, 67 are so spaced in relation to the spacing between the individual dents 63 on the encoder wheel 61 that light transmitter and light receiver of one sensor, in this case the third sensor 67, is fully blocked by the relevant dent 63. At the same time the second sensor 66 is in a fully light transmitting state, while the first sensor 65 is in a half light transmitting state. This positioning of the first to third sensors 65, 66, 67 is achieved by spacing each sensor at an interval to the other sensor that is less than two-times the spacing distance between adjacent dents 63 on the encoder wheel 61.

Figure 10:
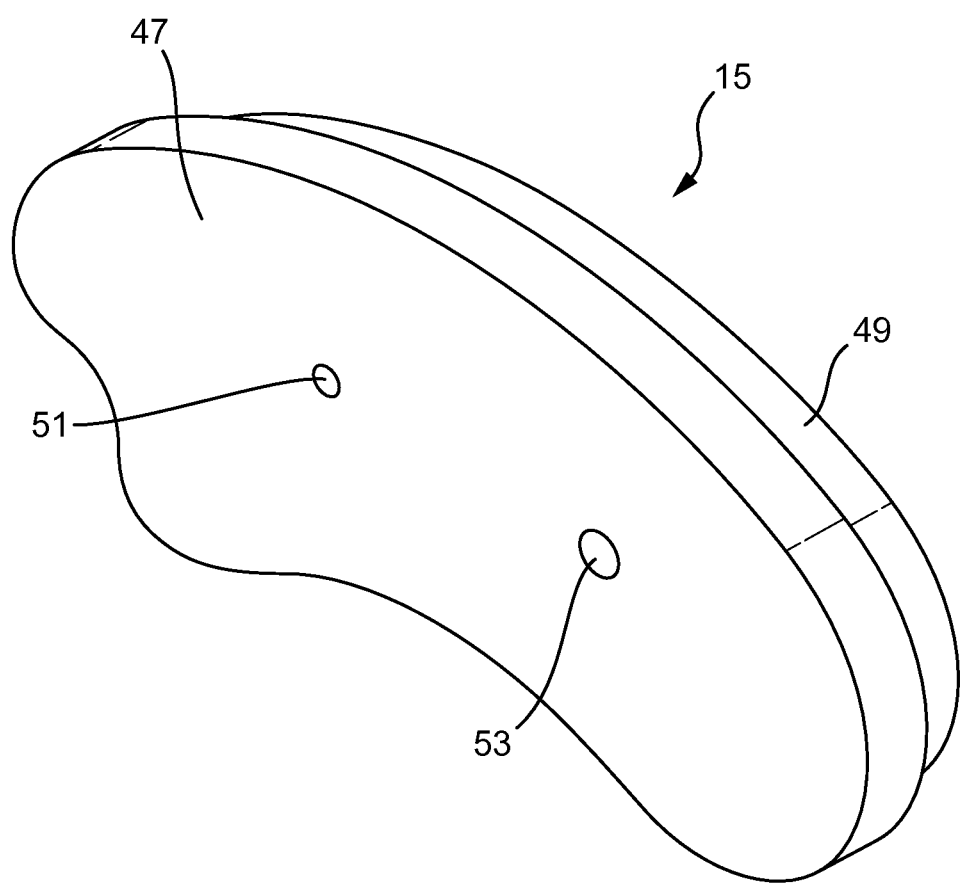
FIG. 10 is a ceramic side element of the ceramic valve unit of FIGS. 1 and 2.
Figure 11:
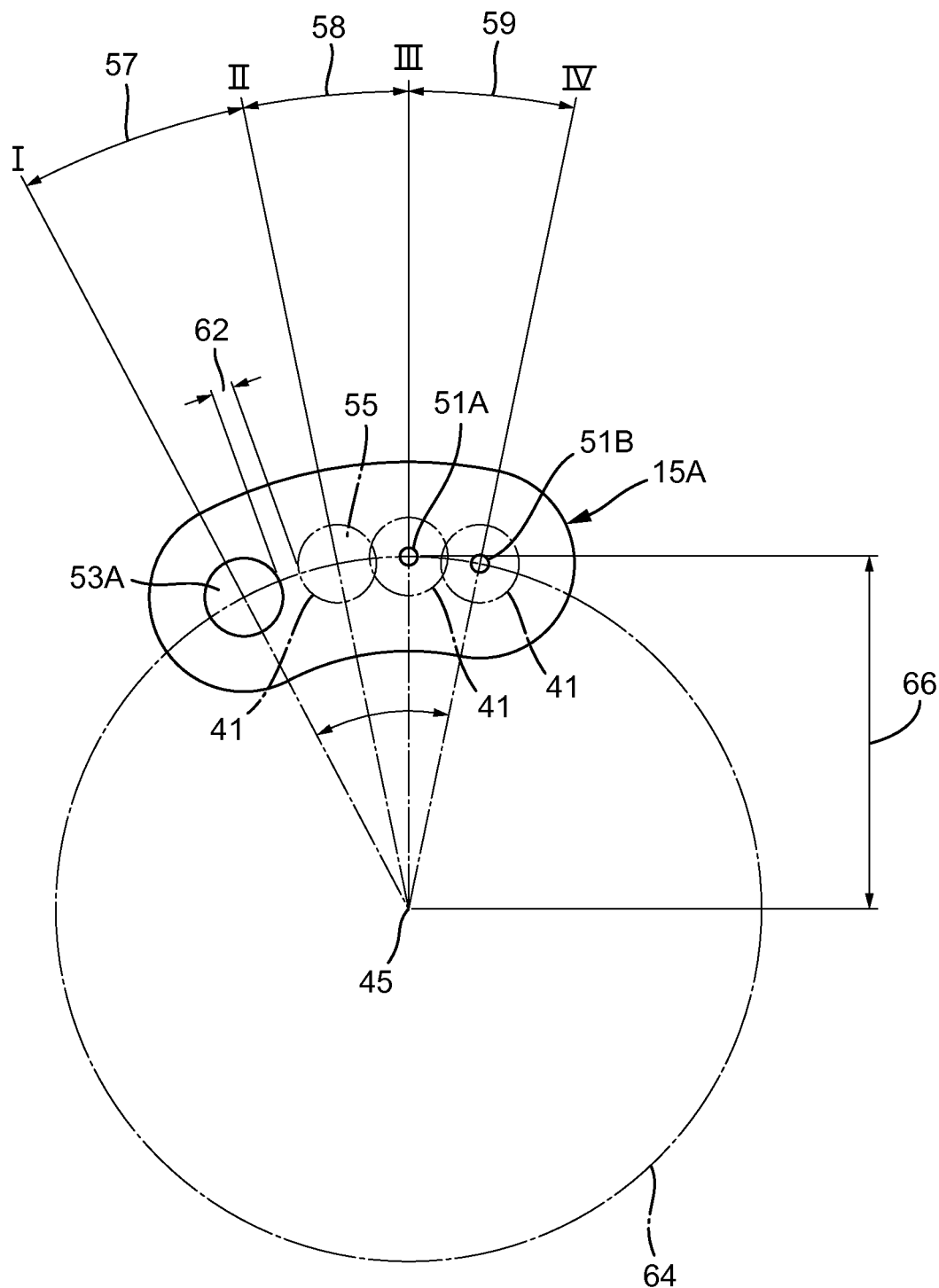
FIG. 11 is a schematic view of another form of ceramic slide element alternative to that of FIG. 10.
Figure 12:
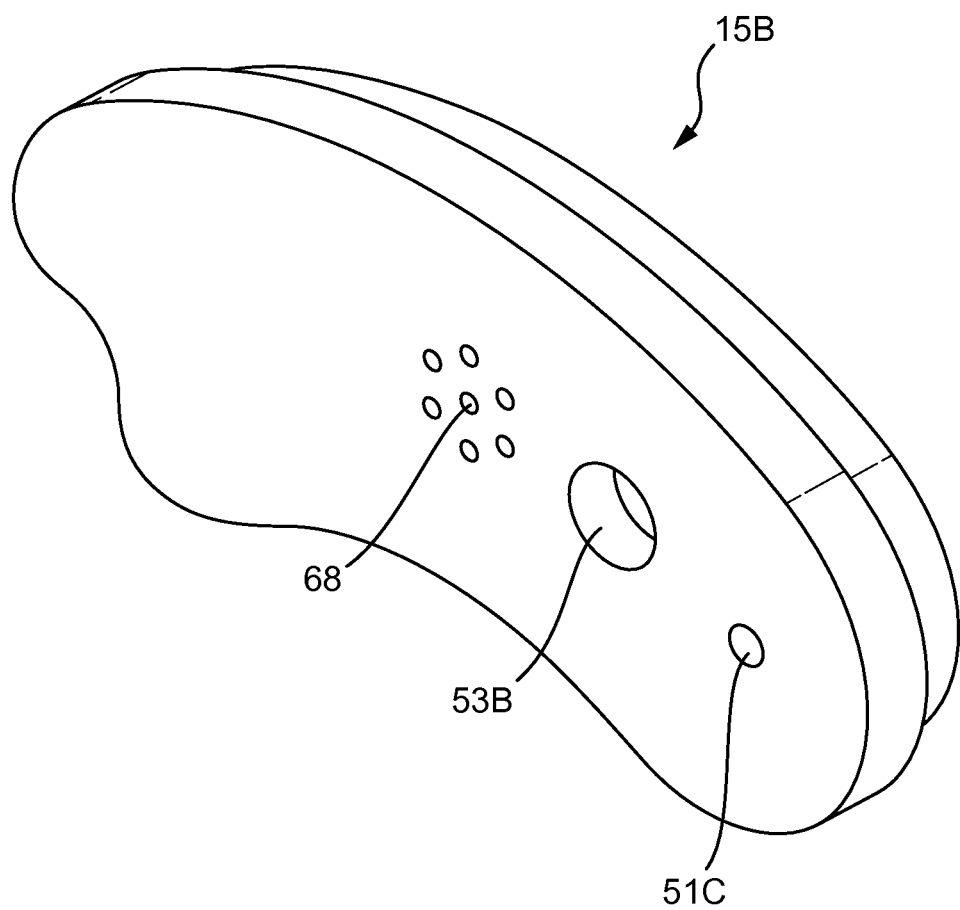
FIG. 12 is yet another ceramic slide element alternative to FIG. 10 or 11

In FIG. 10 is shown a first embodiment of the ceramic slide element 15. The ceramic slide element 15 has a first face 47 and a second face 49. The first face 47 is abutted by the spring biased inlet element 11, and the second face 49 abuts the ceramic outflow element 21. The abutting faces are preferably polished to ensure an appropriate fluid tight sealing between the abutting faces. In the example shown in FIG. 10 the ceramic slide element 15 has a small nozzle 51 and a relatively large unrestricted opening 53. In between the nozzle 51 and opening 53 is a closed area with a sufficient margin with respect to the outflow opening 41 to enable a closed position to be selected for the slide element 15. It will be clear to the skilled person that angular rotation of the operating arm sector 17 by motor 19 can selectively position one of the nozzle 51, the closed area, or the larger opening 53 in an outlined position with respect to the outflow opening 41. When the nozzle 51 is in an aligned position with respect to the outflow opening 41, hot water entering the water inlet pipe 7 will form a jet of water that enters the mixing chamber 25 to form a foamed beverage. When the larger opening 53 is brought into position with respect to the outflow opening 41 then a flat beverage, such as black coffee without foam may be obtained. In an intermediate closed position the hot water supply will be completely closed, and the hot water supply may be diverted to another location in the beverage machine in which the present ceramic valve unit is mounted. FIG. 11 schematically illustrates a further example of a ceramic slide element 15A, which may replace the slide element of the previous example. The ceramic slide element 15A of FIG. 11 is for a four position valve. A first position I corresponds to a large opening 53A, a second position II to a closed position 55, a third position III to a first nozzle 51A and a fourth position IV to a second nozzle 51B. Because there needs to be a sufficient margin of overlap between the positions to ensure fluid lightness the distance of movement between the boundaries of the successive openings the angle of movement 57, between positions I and II is larger than the angular movements 57, 58 between the positions II and III, and III and IV. This is to ensure a sufficient margin 62 between the large opening 53A and the contour of the outflow opening 41 indicated in dash dotted lines in FIG. 11. The sliding movement of the slide element 15A is about a circular path 64 about a radius 66 about a centre of the central journal 45. The individual positions I, II, III, IV of the slide element 15A are controlled by an electric motor such as 19 in FIG. 1 and may be programmed in a suitable control unit. As further shown in FIG. 12 it is further possible in another four position example to have a position wherein multiple nozzles 68 are aligned with the outflow opening 41 of the second housing part 5. The other position are again a closed position, a large opening 53B and a nozzle 51C.

The valve nozzle geometry and these of the larger sized openings has been chosen to be entirely and uninterruptedly straight in their axial directions. This geometry helps to prevent the deposition or accumulation of line scale particles. Furthermore it has been discovered that regular operation of the ceramic valve to select a different nozzle or opening also shears any lime deposited lime scale particles so that the so formed smaller particles can easily pas through the nozzle to disappear. This action has been termed "particle scraping".

The valve element 37 provides a simple and efficient water/air control.

When a closed position is selected for the ceramic slide element 15, 15A, 15B the water supply is completely separated from the outflow opening 41, but a return path for the hot water may be formed on the first face 47 of the ceramic slide element.

It is further conceivable that a cleaning agent is introduced through a special opening or nozzle of the ceramic slide element.

Figure 13:
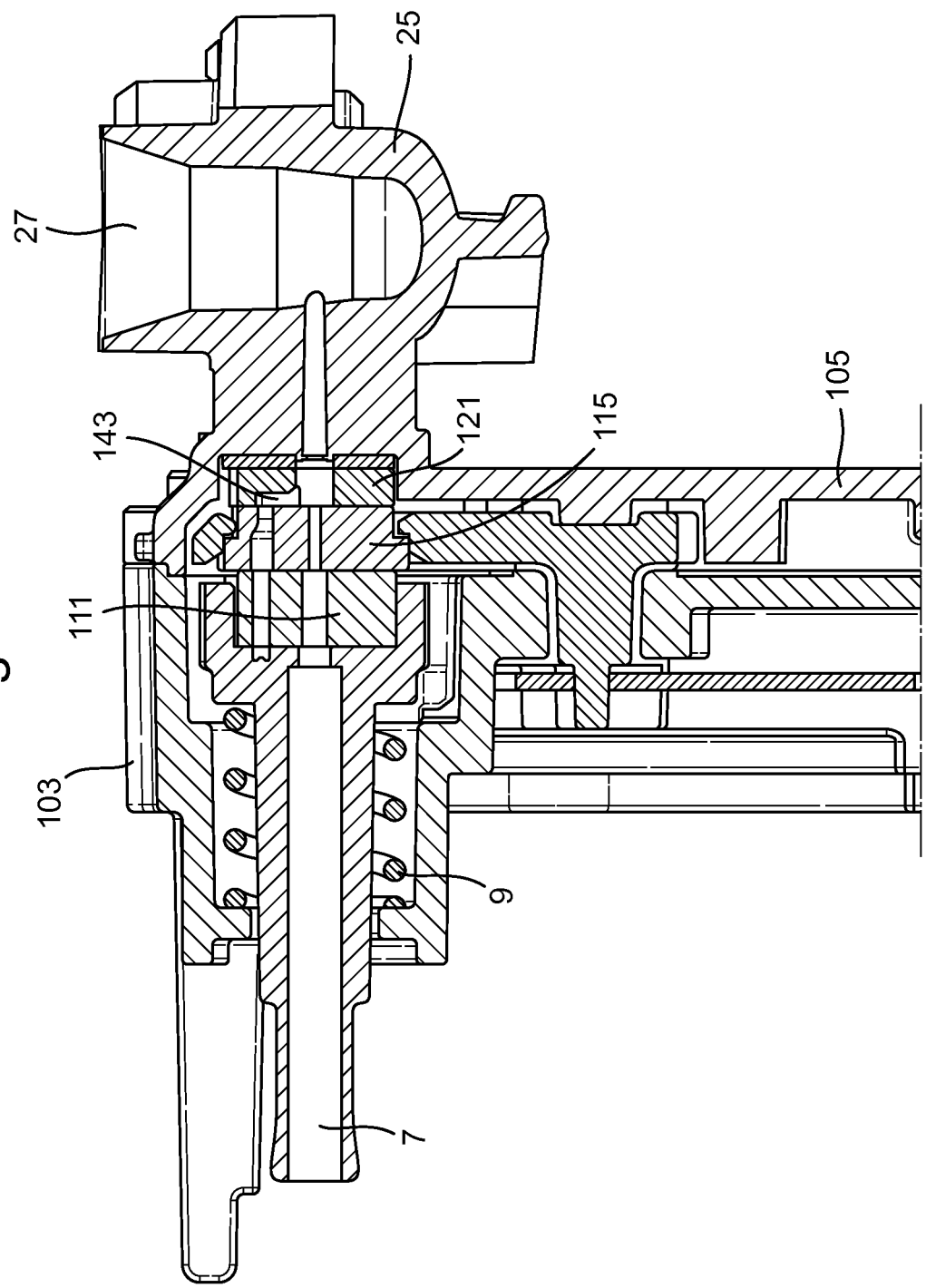
FIG. 13 shows an optional embodiment of the invention, viewed in an direction opposite to that of FIG. 1.

In a further optional embodiment of the invention, as illustrated in FIG. 13, a connecting channel 143 for allowing air and flush water to flow to the T-junction with the water flow path is arranged in a modified outflow element 121. The modified outflow element 121 cooperates with an also modified slide element 115, and an also modified inlet element 111. This modification also requires modified first and second housing parts 103, 105, while the other components can remain substantially as described above.

While in the above the inlet element 11, 111, the slide element 15, 115, and the outflow element 21, 121 have been referred to as ceramic elements, it is to be understood that other wear resistant, such as POM, may also be employed for one or more of these components.

Also, when a slide element is used that only needs to select between a nozzle position and a closed position, it is also possible to provide the nozzle aperture in one of the inlet or outflow elements. In that arrangement the slide element need only have a relatively large opening.

Hence a ceramic valve unit (1) for a beverage machine is described that includes a housing (first part 3, second part 5), a water inlet pipe (7) for receiving hot water, an outflow opening (41), and first and second ceramic elements (ceramic slide element 15, outflow element 21) within the housing. The first and second ceramic elements (15, 21) each have mutually abutting surfaces (including second face 49 of slide element 15) and are relatively movable in a plane common to the abutting surfaces. The plane common to the abutting surfaces (49) is downstream of the water inlet pipe (7) and the first ceramic element (15), but upstream of the second ceramic element (21) and the outflow opening (41). The first ceramic element (15) has at least differently sized first and second openings (small nozzle 51, larger opening 53) for allowing a liquid flow there through. The second ceramic element (21) has only a single liquid flow opening permanently aligned with the outflow opening (41) in the second housing part (5). The first ceramic element (15) is selectively slidable between at least first and second different positions in a path of movement about a centre of rotation (about central journal 45) beyond the boundaries of the first ceramic element (15).

It is thus believed that the operation and construction of the present invention will be apparent from the foregoing description and drawings appended thereto. For the purpose of clarity and a concise description features are described herein as part of the same or separate embodiments, however, it will be appreciated that the scope of the invention may include embodiments having combinations of all or some of the features described. It will be clear to the skilled person that the invention is not limited to any embodiment herein described and that modifications are possible which may be considered within the scope of the appended claims. Also kinematic inversions are considered inherently disclosed and can be within the scope of the invention. In the claims, any reference signs shall not be construed as limiting the claim. The terms 'comprising' and 'including' when used in this description or the appended claims should not be construed in an exclusive or exhaustive sense but rather in an inclusive sense. Thus expression as 'including' or 'comprising' as used herein does not exclude the presence of other elements, additional structure or additional acts or steps in addition to those listed. Furthermore, the words 'a' and 'an' shall not be construed as limited to 'only one', but instead are used to mean 'at least one', and do not exclude a plurality. Features that are not specifically or explicitly described or claimed may additionally be included in the structure of the invention without departing from its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. To the extent that structure, material, or acts are considered to be essential they are inexpressively indicated as such. Additions, deletions, and modifications within the purview of the skilled person may generally be made without departing from the scope of the invention, as determined by the claims.

The invention claimed is:

1. A ceramic valve unit for a beverage machine, the ceramic valve unit including a housing, a water inlet pipe for receiving hot water, an outflow opening, and first and second ceramic elements within the housing, the first and second ceramic elements each having mutually abutting surfaces and being relatively movable in a plane common to the abutting surfaces, wherein the plane common to the abutting surfaces is downstream of the water inlet pipe and the first ceramic element, but upstream of the second ceramic element and the outflow opening, wherein the first ceramic element has at least differently sized first and second openings for allowing a liquid flow there through, wherein the second ceramic element has only a single liquid flow opening permanently aligned with the outflow opening, and wherein the first ceramic element is engaged for sliding movement by an operating arm sector of a material different from ceramic, wherein the first and second ceramic elements are biased in mutual abutting relationship by a compression spring.

2. The ceramic valve unit according to claim 1, wherein the first ceramic element is selectively slidable between at least first and second different positions in a path of movement about a centre of rotation positioned beyond the boundaries of the first ceramic element.

3. The ceramic valve unit according to claim 1, wherein the first opening is a nozzle for generating a jet.

4. The ceramic valve according to claim 1, wherein the second opening of the first ceramic element and the single liquid flow opening of the second ceramic element are the same size.

5. The ceramic valve unit according to claim 1, wherein the first and second ceramic valve elements are biased against a resilient elastomeric pad resting against an inside of the housing coinciding with the outflow opening and having a through flow opening corresponding therewith.

6. The ceramic valve according to claim 5, having an air inlet passage outside of the path of movement of the first ceramic element, and arranged to cooperate with a movable valve element that is integrally formed with the resilient sealing pad.

7. The ceramic valve according to claim 6, wherein the air inlet passage joins the outflow downstream of the second ceramic element.

8. The ceramic valve according to claim 6, wherein the air inlet passage joins the outflow in a T-junction.

9. The ceramic valve according to claim 1, wherein the first ceramic element is movable between at least three different positions, and wherein an additional third position is a closed position.

10. The ceramic valve according to claim 9, wherein the first ceramic element is movable between at least four different positions, and wherein an additional fourth position has a plurality of nozzles aligned with the single liquid flow opening of the second ceramic element.

11. The ceramic valve unit according to claim 1, wherein movement of the first ceramic element between at least its first and second different positions is effected by an electric motor.

12. The ceramic valve unit according to claim 11, wherein rotation of the electric motor governed by an encoder that is arranged to detect the at least first and second positions.

13. The ceramic valve unit according to claim 12, wherein a path of movement of the first ceramic element is about a centre of rotation, and wherein the encoder includes an encoder wheel, and at least one encoder sensor.

14. The ceramic valve unit according to claim 13, wherein the encoder wheel has a plurality of equally spaced dents about its outer periphery, and wherein the at least one encoder sensor is a middle one of first, second, and third sensors positioned in a sensing path coincident with the plurality of spaced dents.

15. The ceramic valve unit according to claim 14, wherein the first, second, and third sensors are spaced from one another at an interval that is less than two-times a spacing distance between adjacent dents on the encoder wheel.

16. The ceramic valve unit according to claim 1, in combination with a mixing chamber, which mixing chamber is integrally formed with the housing of the ceramic valve unit.

17. The ceramic valve unit of claim 16, wherein the mixing chamber has an inlet adapted connect to an outlet of a dosing device for a liquid beverage related product.

18. The ceramic valve unit according to claim 17, wherein the dosing device is part of an exchangeable product supply pack.

19. A beverage preparation machine comprising:
a mixing chamber having an inlet for receiving a doser outlet of an exchangeable supply pack,
a beverage outlet,
liquid supply means including a liquid flow path for supplying a liquid [water under pressure] to the mixing chamber; air supply means for supplying air to the liquid flow path,
a drive shaft, and
a ceramic valve unit including a housing, a water inlet pipe for receiving hot water, an outflow opening, and first and second ceramic elements within the housing, the first and second ceramic elements each having mutually abutting surfaces and being relatively movable in a plane common to the abutting surfaces, wherein the plane common to the abutting surfaces is downstream of the water inlet pipe and the first ceramic element, but upstream of the second ceramic element and the outflow opening, wherein the first ceramic element has at least differently sized first and second openings for allowing a liquid flow there through, wherein the second ceramic element has only a single liquid flow opening permanently aligned with the outflow opening, and wherein the first ceramic element is engaged for sliding movement by an operating arm sector of a material different from ceramic.

20. A system for preparing beverage consumptions, the system comprising:
a beverage preparation machine, and
at least one exchangeable supply pack arranged for holding a beverage related ingredient;
wherein the beverage preparation machine comprises a mixing chamber having a beverage outlet, liquid supply means including a liquid flow path for supplying a liquid [water under pressure] to the mixing chamber; air supply means for supplying air to the liquid flow path, and a drive shaft;
wherein the at least one exchangeable supply pack includes a container for holding a beverage related ingredient, and a doser having an outlet, wherein the doser is arranged for supplying the beverage related ingredient from the container to the outlet of the doser in a dosed manner;
wherein the at least one exchangeable supply pack and the beverage preparation machine are mechanically connectable, and wherein when connected the outlet of the doser is brought in fluid communication with the mixing chamber and the beverage preparation machine is arranged for activating the doser for supplying the ingredient from the outlet of the doser into the mixing chamber, wherein the liquid flow path is arranged to include a second nozzle for generating a jet of liquid which, in use, spouts into the mixing chamber, characterized in that the system further comprises a ceramic valve unit integrated into the beverage device, the ceramic valve unit including a first, second and third ceramic element wherein the third ceramic element including an outflow opening and the second element includes an inflow opening which is at least substantially aligned with the outflow opening, and wherein the first element is sandwiched between the third and second element, the first, second and third ceramic elements each having mutually abutting surfaces and wherein the first element is movable relative to the third and second element in a plane common to the abutting surfaces, wherein the first ceramic element comprises the second nozzle for allowing a liquid flow there through if the nozzle is substantially aligned with the inflow and outflow opening, and wherein the first ceramic element is selectively slidable between at least first and second different positions in a path of movement about a centre of rotation beyond the boundaries of the first ceramic element wherein in the first position the second nozzle is substantially aligned with the inflow and outflow opening so that a jet of the fluid is generated by the second nozzle and spouts via the outlet opening into the mixing chamber and wherein in the second position the second nozzle is not aligned with the inflow and outflow opening so that fluid can not flow from the inlet opening to the nozzle for generating the jet.

21. The system according to claim 20, wherein the liquid flow path includes a first nozzle arranged for generating a hollow jet of liquid having an outer liquid portion and an inner air portion.

22. The system according to claim 21, wherein the first nozzle terminates at a side wall of the mixing chamber, and wherein the outer liquid portion of the hollow jet contacts a substantial portion of an inner surface of the first nozzle in an area adjacent to the mixing chamber.

23. The system according to claim 22, wherein the first nozzle tapers towards the mixing chamber, and wherein the liquid flow path comprises the second nozzle located upstream from the first nozzle and arranged for generating a substantially solid jet of liquid.

24. The system according to claim 23, wherein in the first position the first and second nozzle are positioned relative to each other such that the substantially solid jet of liquid generated by the second nozzle impacts an inner surface of the first nozzle in an impact zone causing the jet to swirl around the inner surface of the first nozzle and forms a hollow jet of liquid which spouts into the mixing chamber.

25. The system according to claim 23, wherein in a third position of the first element relative the third and second element the first and second nozzle are positioned relative to each other such that the substantially solid jet of liquid impact generated by the second nozzle is at least substantially aligned with the first nozzle so that the solid jet from the second nozzle flows along an inner surface of the first nozzle and the jet remains solid so that the jet which spouts into the mixing chamber is a solid jet.

26. The system according to claim 20 wherein the plane common to the abutting surfaces is downstream of the first ceramic element, but upstream of the third ceramic element and the outflow opening, wherein the first ceramic element has an opening differently sized than the second nozzle, wherein the third ceramic element has only a single liquid flow opening permanently aligned with the outflow opening, and wherein the first ceramic element is engaged for sliding movement by an operating arm sector of a material different from ceramic.

27. A ceramic valve unit for a beverage machine, the ceramic valve unit including a housing, a water inlet pipe for receiving hot water, an outflow opening, and first and second ceramic elements within the housing, the first and second ceramic elements each having mutually abutting surfaces and being relatively movable in a plane common to the abutting surfaces, wherein the plane common to the abutting surfaces is downstream of the water inlet pipe and the first ceramic element, but upstream of the second ceramic element and the outflow opening, wherein the first ceramic element has at least differently sized first and second openings for allowing a liquid flow there through, wherein the second ceramic element has only a single liquid flow opening permanently aligned with the outflow opening, and wherein the first ceramic element is engaged for sliding movement by an operating arm sector of a material different from ceramic, wherein the first and second ceramic elements are biased in mutual abutting relationship by a compression spring,
   wherein the first ceramic element is moveable between at least four different positions, wherein an additional third position is a closed position, and wherein an additional fourth position has a plurality of nozzles aligned with the single liquid flow opening of the second ceramic element.

28. A ceramic valve unit for a beverage machine, the ceramic valve unit including a housing, a mixing chamber integrally formed with the housing, a water inlet pipe for receiving hot water, an outflow opening, and first and second ceramic elements within the housing, the first and second ceramic elements each having mutually abutting surfaces and being relatively movable in a plane common to the abutting surfaces, wherein the plane common to the abutting surfaces is downstream of the water inlet pipe and the first ceramic element, but upstream of the second ceramic element and the outflow opening, wherein the first ceramic element has at least differently sized first and second openings for allowing a liquid flow there through, wherein the second ceramic element has only a single liquid flow opening permanently aligned with the outflow opening, and wherein the first ceramic element is engaged for sliding movement by an operating arm sector of a material different from ceramic, wherein the first and second ceramic elements are biased in mutual abutting relationship by a compression spring, and
   wherein the mixing chamber has an inlet adapted connect to an outlet of a dosing device for a liquid beverage related product.

* * * * *